3,228,793
PROCESS FOR RUBBERIZING TEXTILE MATERIAL WITH A SATURATED COPOLYMER OF OLEFINS
Hans Dieter Stemmer, Bad Soden, Taunus, Erich Schmidt, Schonberg, Taunus, and Jakob Winter and Alfred Kuhlkamp, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Apr. 3, 1962, Ser. No. 184,690
Claims priority, application Germany, Apr. 5, 1961, F 33,593
6 Claims. (Cl. 117—161)

The present invention relates to a process for rubberizing textile material with a saturated amorphous copolymer of olefins.

It is known to produce linear copolymers of high molecular weight from ethene and $\alpha$-olefins, for example ethene and propene. If the said copolymers contain between 20 and 70 mol percent of propene the partial crystallization, to which the corresponding homopolymers are strongly subjected, is substantially reduced so that typical rubbers are obtained, the properties of which differ from those of natural rubbers and known synthetic rubbers only by the practically complete lack of unsaturated linkages (double bonds).

It is, therefore, impossible to cross-link the substantially saturated amorphous copolymers like rubbers containing double bonds with the aid of sulfur and vulcanization accelerators. A vulcanization can only be brought about with organic peroxides, if necessary together with sulfur or unsaturated monomers. In admixture with the copolymers there are produced, on heating with the exclusion of air, polymer radicals which are capable of being recombined and cause cross-linking.

In the manufacture of many articles and shaped bodies of rubber (for example tires, conveyer belts, cone belts or clothing) a reinforcement is absolutely necessary by inserting cord and fabrics. In order to obtain a sufficient bondage a chemical bond (chief valence linkage) is required. It is known to prepare the textile materials with latices which contain, in addition to the emulsified rubber, resin formers, for example resorcinol and formaldehyde, so that on drying or in the vulcanization a solid bond between the rubber and the textile material is produced. The textile materials which have thus been rendered capable of reacting with rubber are then incorporated in known manner into the rubber mixtures and during the vulcanization they are mostly completely bonded to the surrounding rubber masses.

Still further, it is known to prepare the textile materials not with latices but with solutions of the rubber containing di-or polyisocyanates which produce the necessary bond between the rubber and the textile material.

When a cord filament or a fabric is treated in the manner described above with the latex or the solution of copolymers of olefins, for example of ethene and propene, a bond between the rubber and the textile material is not obtained. Such a bond is not produced either when textile materials are prepared in known manner with natural or synthetic rubber containing double bonds and the prepared textile materials are incorporated into mixtures the rubber constituents of which consist wholly or partially of saturated amorphous copolymers of olefins. If a textile material, which has been prepared in known manner with an unsaturated natural or synthetic rubber, is incorporated into a mixture the rubber constituent of which likewise consists of unsaturated natural or synthetic rubber, and the blanks obtained are bonded in the vulcanization to mixtures the rubber constituent of which consists of the afore-mentioned copolymers of olefins, a sufficient bond is not produced even if intermediate layers of mixtures of a rubber containing double bonds and saturated amorphous copolymers are applied to the material.

It has now been found that textile materials can be rubberized with saturated amorphous copolymers of $\alpha$-olefins with one another or with ethene by preparing the dry textile material, in the presence of an isocyanate, with a modified copolymer of $\alpha$-olefins with one another or with ethene, which modified polymer is capable of reacting with isocyanates, and vulcanizing the material into a mixture the rubber constituents of which are amorphous copolymers of $\alpha$-olefins with one another or with ethene.

Such modified copolymers which are capable of reacting with isocyanates can be obtained, for example, by adding an organic peroxide and compounds which contain, in addition to a reactive double bond, other functional groups, such as the OH—, NH=, $NH_2$—, or —NH—$CH_2$OH group, or a further reactive carbon-carbon double bond to a solution of a copolymer of ethene with one or several of its higher homologs, as obtained for example by the Ziegler low pressure process (cf. Raff-Allison, "Polyethylene," 1956, Interscience Publishers, Inc., New York, page 78 et seq.) preferably copolymers of ethene and propene and/or butene-1 containing 30–70 mol percent of ethene, and heating the solution for 1 to 72 hours and preferably 4 to 24 hours at a temperature above 50° C., suitably in the range of 50 to 120° C. For preparing the solutions there are used inert organic solvents such as benzene, chlorobenzene or gasoline. The amount of organic peroxide added, such as a dialkyl peroxide, for example di-tertiary butyl peroxide and dicumyl peroxide, a diacyl peroxide, for example di-benzoyl peroxide, a per-acid ester, for example tertiary butyl perbenzoate, or a hydroperoxide, for example cumyl hydroperoxide and tertiary butyl hydroperoxide, varies between 0.25 and 20% by weight and suitably 0.25 and 10% by weight, calculated on the dissolved polymer. On account of the many reactions compounds can undergo which contain, in addition to the reactive double bond, other functional groups (OH—, NH=, $NH_2$—, —NH—$CH_2$OH or carbon-carbon double bonds) for example acrylamide, methacrylamide and methylolacrylamide, the concentration of one of these compounds in the solution can vary within wide limits, in the case of acrylamide the concentration being preferably 1 to 50% by weight, calculated on the dissolved polymer, and in the case of N-methylolacrylamide the concentration being preferably 1 to 30% by weight, calculated on the dissolved polymer. The reaction being terminated, graft-copolymers are obtained having lateral or terminal OH—, NH=, $NH_2$— or —NH—$CH_2$OH groups or carbon-carbon double bonds.

Modified copolymers of $\alpha$-olefins which are capable of reacting with isocyanates can be prepared in an especially easy manner by heating for a prolonged period of time copolymers of ethene with one or several of its higher homologs, preferably copolymers of ethene with propene, either in solution or in the solid state, with radical liberating agents, for example organic peroxides.

The products thus obtained have a reduced molecular weight and contain oxygen in addition to carbon and hydrogen. Said modification which is assumably based on a kind of guided oxidation, can be intensified and accelerated by operating in the presence of an aldehyde, preferably formaldehyde.

For preparing a modified copolymer, a copolymer of ethene and propene for example is dissolved in an inert organic solvent, such as benzene, chlorobenzene or gasoline and to the solution obtained there are added 0.25–20 percent by weight (calculated on the copolymer) of an organic peroxide, for example a diacyl peroxide, a dialkyl peroxide, a hydroperoxide or a per-acid ester, and 0–30% by weight (calculated on the copolymer) of formaldehyde in the form of an aqueous solution, of a gas or as paraformaldehyde. The solution is heated for 1 to 72 hours and preferably 4 to 24 hours at a temperature above 50° C., and preferably in the range of 50 to 120° C., and the reaction product is isolated. After having added 1 to 30 and suitably 2 to 10% by weight of a di- or polyisocyanate, for example toluylene diisocyanate, the product can be cross-linked at 140–160° C. It is known that isocyanates are capable of reacting with OH—, NH=, or NH$_2$-groups of textiles. Consequently, a solid bond between fibers and the modified copolymer can be produced when textile materials such as fibers, cord or fabrics of natural or regenerated cellulose, silk, wool, polyamides or polyesters are prepared in the following manner:

The textile materials, which contain OH—, NH= and/or NH$_2$-groups are dried, if necessary, in order to eliminate absorbed humidity and then dipped in the solution of an amorphous copolymer of α-olefins, which has been modified as described above, and a di- or polyisocyanate in an organic solvent, while care is taken that the material is thoroughly wetted. The selection of the organic solvent is limited in that it must dissolve the modified copolymer as well as the isocyanate without restricting the reactivity of the dissolved components. Suitable solvents are aliphatic, cycloaliphatic and aromatic and also halogenated hydrocarbons such as gasoline, cyclohexane, benzene or chlorobenzene, which do not react with isocyanates. Since the increase in weight of the textile material after impregnating and drying shall amount to 0.5 to 30%, preferably 2 to 15%, it is suitable to use an immersion solution containing 0.5 to 10% by weight of rubber constituent. The required concentration of the isocyanate compound in the immersion solution depends on the molecular weight and the reactivity of the di- or polyisocyanate, and generally ranges from 0.1 to 20 and preferably from 0.1 to 2% by weight, calculated on the total solution. Suitable di- or polyisocyanates are, for example, methane-tri-(phenyl-isocyanate-4), 2,4-toluylene diisocyanate, hexamethylene diisocyanate, or naphthylene diisocyanate.

When the textile material is to be prepared in continuous manner a gradually occurring gelation of the solution may be detrimental. In this case it is of advantage first to dip the dry textile material in a solution containing 0.1 to 20 and preferably 0.1 to 8% by weight of the diisocyanate or polyisocyanate in the desired solvent. The textile material is then dipped in a second bath containing the dissolved modified polymer. Care must be taken that after the subsequent drying the increase in weight of the textile material amounts to 0.5 to 30% and preferably 0.5 to 5% so that a good bonding of the prepared textile material with the polyolefin rubber mixture in the vulcanization is ensured. The second bath is a solution containing 0.2 to 10% by weight and preferably 0.5 to 2% by weight of the modified polymer.

After the immersion or immersions the textile material may be freed from adhering drops by mechanic means and is then dried in dry air or under reduced pressure.

The textile materials which have been prepared in this manner are incorporated in known manner into mixtures containing amorphous copolymers of α-olefins, preferably of ethene and propene obtained by the Ziegler low pressure process, vulcanization agents such as peroxides, for example dicumyl peroxide, tertiary butyl-cumyl peroxide, di-tertiary butyl peroxide or 2,5-dimethyl-2,5-bis (tertiary butyl peroxy)-hexane, sulfur and/or unsaturated monomers, for example maleic anhydride or divinyl adipate, usual rubber fillers, for example carbon black and silica, and plasticizers, for example paraffinic and/or naphthenic oils, and the desired shaped articles are produced by vulcanization. It is known that a satisfactory bonding of the prepared textile material with the surrounding rubber masses often cannot be reached in the vulcanization on account of the fact that the rubber constituents of the prepared textile material are not compatible with the rubber constituents of the surrounding rubber masses. It was, therefore, surprising that a textile material which had been prepared as described above with a modified copolymer of olefins could be well bonded to a mixture the rubber constituent of which consisted of a non-modified copolymer of olefins.

The following examples serve to illustrate the invention but they are not intended to limit it thereto, the parts being by weight unless otherwise stated.

*Example 1*

An amorphous copolymer of ethene and propene having a propene content of 36 mol percent and a reduced specific viscosity (RSV) of 3.0, determined in a capillary viscometer with a 0.1% solution in decahydronaphthalene at 135° C., was dissolved in chlorobenzene in an amount such that the solution contained 5% by weight of copolymer. 13% by weight of paraformaldehyde and 2% by weight of dibenzoyl peroxide (the percentages being calculated on the polymer) were added to the solution and the solution was stirred for 8 hours at 90° C. The solvent was distilled off with steam within the course of 2½ hours and the precipitating rubber was dried at 50° C. under reduced pressure. The dried product contained 2.3% of oxygen and had a reduced specific viscosity of 2.3.

For testing the capability of reacting with isocyanates 100 parts of modified copolymer
50 parts of commercial carbon black
6 parts of 2,4-toluylene-diisocyanate were vulcanized for 25 minutes at 160° C. The vulcanizates obtained had the following mechanical values:

Tensile strength (DIN 53504) _____kg./cm.$^2$__ 75
Modulus at 300% elongation
  (DIN 53504) _____kg./cm.$^2$__ 29
Permanent elongation (DN 53511) _____percent__ 12

The modified ethene/propene copolymer was dissolved in chlorobenzene and mixed with methane-tri(phenyl-isocyanate-4) to the following solution which contained 150 parts of chlorobenzene
5 parts of modified copolymer
2 parts of methane-tri-(phenylisocyanate-4)

Rayon cord thread was dipped for 1 minute in the above solution, withdrawn from the solution, mechanically freed from adhering drops and dried at 70° C. The average increase in weight of the cord thread was 6.7%.

The prepared cord thread was then vulcanized into a mixture composed of 100 parts of ethene/propene copolymer (33 mol percent propene, RSW 2.8)
50 part sof high abrasion furnace black
2 parts of paraffin oil
2.7 parts of dicumyl peroxide
0.3 part of sulfur for 30 minutes at a temperature of 160° C. The vulcanizates obtained were rubber bars 245 mm. long, 10 mm. wide and 8 mm. thick from which hung out vertically at the right and the left side each 12 ends of the prepared cord thread. The adhesiveness of the incorporated cord was examined by clamping one of the cord ends in one clamp and the rubber bar in the other clamp of a tension testing machine. The force required for pulling the cord thread out of the 10 mm. wide rubber bar was 5.5 kg. on the average.

Example 2

The amorphous copolymer of Example 1 was modified in the same manner with the exception that 4% by weight of dibenzoyl peroxide were used instead of 2% by weight, calculated on the polymer. The dried product contained 2.4% of oxygen and had a reduced specific viscosity of 2.0.

For testing its capability of reacting with isocyanate the modified copolymer was treated as described in Example 1. The vulcanizates obtained had the following mechanical values:

Tensile strength (DIN 53504) _____ kg./cm.$^2$__ 125
Modulus at 300% elongation (DIN 53504) kg./cm.$^2$ _____ 74
Permanent elongation (DIN 53511) _____ percent__ 9

The modified ethene/propene copolymer was applied to rayon cord thread as described in Example 1. The average increase in weight of the thread was 5.8%.

The prepared cord thread was vulcanized into a rubber mixture as defined in Example 1 and the adhesiveness was measured. It was 6.1 kg. on the average.

Example 3

The modified ethene/propene copolymer defined in Example 2 was dissolved in chlorobenzene in an amount such that an about 5% solution was obtained. In another vessel an about 1% solution of methane-tri-(phenyliso-cyanate-4) in chlorobenzene was prepared.

Rayon cord thread was dipped first for 60 seconds in the isocyanate solution and then for 60 seconds in the solution of the modified ethene/propene copolymer, the adhering drops of the solution were removed and the thread was dried at 70° C. The average increase in weight of the cord thread was 2.5%. The prepared cord thread was vulcanized in a mixture as defined in Example 1 and the adhesiveness was measured. It was 7.1 kg.

Example 4

An amorphous copolymer of ethene and propene having a propene content of 35 mol percent and a reduced specific viscosity of 2.9 was dissolved in chlorobenzene to obtain a 5% solution. 10% by weight of N-methylolacrylamide and 1% by weight of dibenzoyl peroxide (the percentages being calculated on the polymer) were added to the solution and the whole was stirred for 7 hours at 80–85° C. under nitrogen. The solvent was distilled off with steam within the course of 2½ hours and the precipitating rubber was dried at 50° C. under reduced pressure. The dried product contained 0.8% by weight of nitrogen.

The capability of the modified ethene/propene copolymer of reacting with isocyanate was tested as described in Example 1. The following mechanical values were obtained:

Tensile strength (DIN 53504) _____ kg./cm.$^2$__ 55
Modulus at 300% elongation (DIN 53504) kg./cm.$^2$ _____ 16
Permanent elongation (DIN 53511) _____ percent__ 29

Rayon cord thread was prepared with the modified ethene/propene copolymer as described in Example 3. The average increase in weight of the cord was 2.8%. After having been vulcanized into a rubber mixture as described in Example 1 the cord thread had an adhesiveness of 5.5 kg.

Example 5

A 5% solution in chlorobenzene was prepared from an amorphous copolymer of ethene and propene containing 36 mol percent of propene and having a reduced specific viscosity of 2.9. 20% by weight of acryl amide and 1% by weight of dibenzoyl peroxide (the percentages being calculated on the polymer) were added to the solution. The solution was then stirred for 7 hours at 80° C. under nitrogen and the solvent was distilled off with steam within the course of 2½ hours. The precipitating rubber was dried at 50° C. under reduced pressure. The dried product contained 3.1% of nitrogen.

The capability of reacting with isocyanate of the modified ethene/propene copolymer was tested as described in Example 1. The following mechanical values were obtained:

Tensile strength (DIN 53504) _____ kg./cm.$^2$__ 70
Modulus at 300% elongation (DIN 53504) kg./cm.$^2$ _____ 57
Permanent elongation (DIN 53511) _____ percent__ 12

Rayon cord thread was prepared with the modified ethene/propene copolymer as described in Example 3. The average increase in weight of the cord was 2.2%.

The prepared cord thread was then vulcanized into a mixture as defined in Example 1. Its adhesiveness was 6.2 kg.

We claim:
1. A process for the manufacture of rubber articles formed of textile material and saturated amorphous copolymers of olefins as rubber constituents which comprises
    (a) preparing the dry textile material by dipping it into a solution consisting essentially of an inert organic solvent, 0.1–20% by weight of a member selected from the group consisting of a diisocyanate and a polyisocyanate, and 0.5–10% by weight of a modified copolymer of ethene and propene capable of reacting with isocyanates which modified copolymer has been prepared by reacting a saturated amorphous copolymer of ethene and propene in an inert organic solvent with a radical-forming substance and a compound selected from the group consisting of formaldehyde, acrylamide and N-methylolacrylamide,
    (b) drying the so prepared textile material and
    (c) vulcanizing the dry prepared textile material into a composition consisting essentially of a saturated amorphous copolymer of ethene and propene.

2. A process according to claim 1, wherein the inert organic solvent is a member selected from the group consisting of aliphatic, cycloaliphatic, aromatic hydrocarbons and halogenated hydrocarbons.

3. A process according to claim 1 wherein the modified copolymer of ethene and propene capable of reacting with isocyanates has been prepared by reacting a saturated amorphous copolymer of ethene and propene at a temperature in the range between 50 and 120° C. for 1 to 72 hours with up to 30% by weight, calculated on the polymer, of formaldehyde and with 0.25 to 20% by weight, calculated on the polymer, of a peroxide selected from the group consisting of dialkyl peroxide, diacyl peroxide, an ester of a per-acid and a hydroperoxide as radical-forming substance.

4. A process according to claim 1 wherein the modified copolymer of ethene and propene capable of reacting with isocyanates has been prepared by reacting a saturated amorphous copolymer of ethene and propene at a temperature in the range between 50 and 120° C. for 1 to 72 hours with 1 to 50 percent by weight, calculated on the polymer, of acrylamide and with 0.25 to 20% by weight, calculated on the polymer, of a peroxide selected from the group consisting of dialkyl peroxide, diacyl peroxide, an ester of a per-acid and a hydroperoxide as radical-forming substance.

5. A process according to claim 1 wherein the modified copolymer of ethene and propene capable of reacting with isocyanates has been prepared by reacting a saturated amorphous copolymer of ethene and propene at a temperature in the range between 50 and 120° C. for 1 to 72 hours with 1 to 30% by weight, calculated on the polymer, of N-methylolacrylamide and with 0.25 to 20% by weight, calculated on the polymer, of a peroxide selected from the group consisting of dialkyl peroxide, diacyl peroxide, an ester of a per-acid and a hydroperoxide as radical-forming substance.

6. A process according to claim 1 wherein the textile material consists essentially of a member selected from the group of natural cellulose, regenerated cellulose, wool, silk, polyamides and polyester.

References Cited by the Examiner
UNITED STATES PATENTS

| | | | |
|---|---|---|---|
| 2,780,612 | 2/1957 | Grotenhuis | 117—161 |
| 2,993,807 | 7/1961 | Abbott et al. | 117—72 |
| 3,000,867 | 9/1961 | Fisher | 260—88.2 |
| 3,040,002 | 6/1962 | Aldridge | 260—77.51 |
| 3,041,321 | 6/1962 | Youngman et al. | 260—88.2 |

WILLIAM D. MARTIN, *Primary Examiner.*

RICHARD D. NEVIUS, *Examiner.*